Sept. 11, 1951  J. C. NEEDHAM  2,567,823
LIQUID LEVEL INDICATOR
Filed Nov. 7, 1949
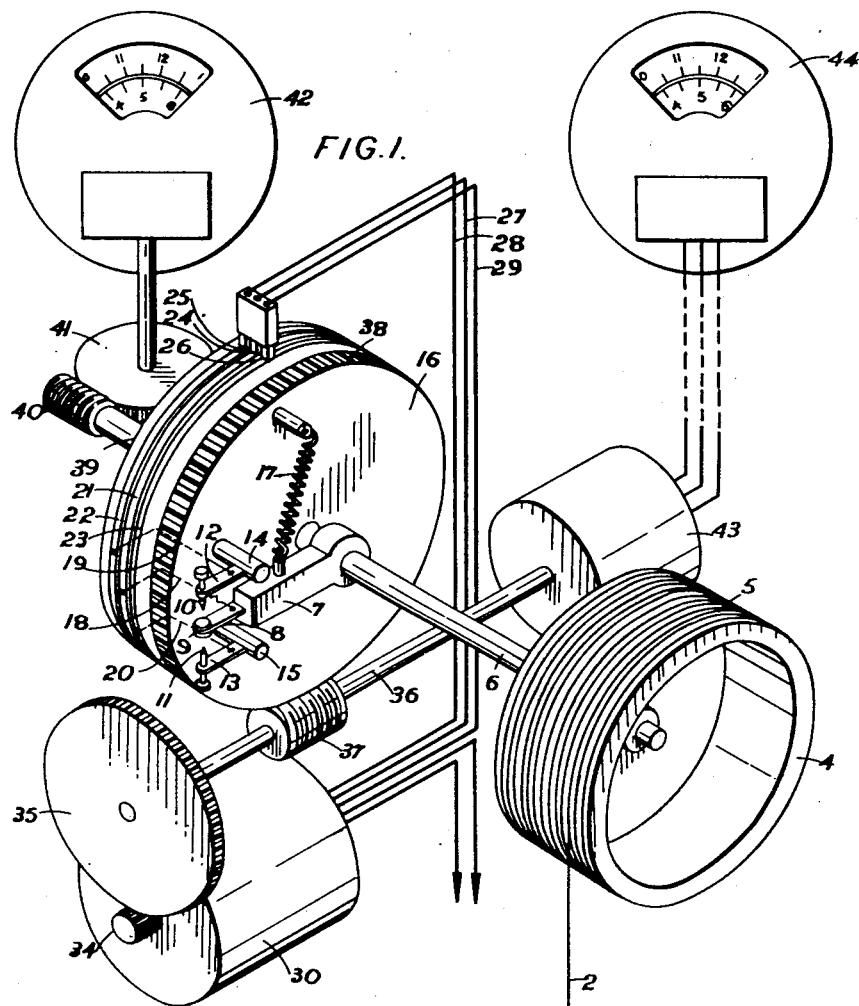
FIG.1.
FIG.2.
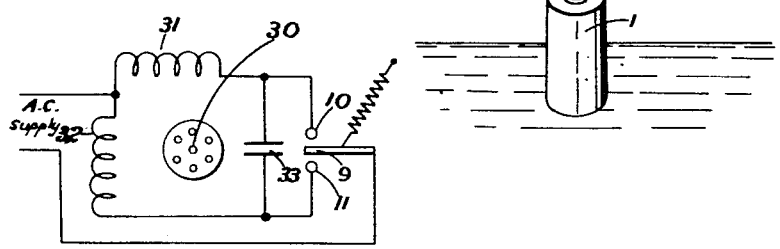
Inventor
John C. Needham
By Ralph B. Stewart
Attorney Patented Sept. 11, 1951

2,567,823

UNITED STATES PATENT OFFICE 2,567,823

LIQUID LEVEL INDICATOR

John Cuthbert Needham, Chiswick, London, England, assignor to Evershed & Vignoles Limited, London, England, a British company Application November 7, 1949, Serial No. 125,959
In Great Britain November 5, 1947

3 Claims. (Cl. 73—313)

This invention relates to apparatus for indicating and measuring the level of liquids and can be applied to the measurement of level of liquids of all kinds, but in particular it is useful in connection with liquids such as oils or spirits which give off an explosive or combustible vapour or which, for some other reason, are liable to be adversely affected by the proximity of electrical contacts.

According to the invention, the apparatus includes a displacer, that is to say a body which is held partly submerged in the liquid to be dealt with so that the weight of the body and the buoyancy of the liquid, acting in opposition, produce a net resultant force which is transmitted to a contact member and, in the equilibrium position of the displacer, is balanced by the reaction of a spring connected to the contact member; the arrangement is such that if the liquid level varies and the buoyancy force on the displacer, and thus the net resultant force, is thereby also varied, the resulting movements of the contact member are communicated to an electrical follow-up mechanism the output member of which consequently takes up a position which corresponds to the liquid level.

The resultant force on the displacer may most conveniently be transmitted to the contact member as the tension in a wire or other cord and it is therefore preferred to arrange that the density of the displacer and its degree of submersion are such that the resultant force is downwards and to suspend the displacer by such a cord. The tension in the wire may then be transmitted to the contact member by passing the wire round a pulley, drum or disc, to the spindle of which the contact member is rigidly secured in the form of a radial arm.

One form of apparatus in accordance with the invention will now be described with reference to the accompanying drawings, in which—

Figure 1 is a perspective view of the apparatus; and

Figure 2 is a schematic circuit diagram.

A displacer in the form of a metal cylinder 1 is suspended by a length of steel wire 2 so as to be about two thirds submerged in the liquid 3 to be dealt with and thus gives a resultant downward force. The wire 2 passes around a pulley 4 having a helical groove 5 on its face for the reception of the wire. The length of the wire 2 is sufficient to allow for the lowest possible level of the liquid 3 and its end is securely anchored to the pulley.

The pulley is fixed to a spindle 6 to which is also secured a contact member in the form of a radial arm 7. This arm is provided with a resilient metal blade extension 8 carrying a double-sided contact 9 which plays between opposite contacts 10 and 11 adjustably carried by resilient arms 12 and 13 secured to insulating pillars 14 and 15 mounted on a rotatable member 16. The downward force provided by the displacer 1 tends to turn the radial arm 7 in a counter-clockwise direction as seen in Figure 1 and this force is counteracted in the equilibrium position of the displacer, by a coiled tension spring 17 connected between the radial arm 7 and the rotatable member 16.

Thus when the liquid level falls and the downward force on the displacer 1 is increased, the reaction of the spring 17 is overcome and the contact 9 touches the contact 11. Similarly, if the liquid level rises, the spring 17 takes charge and the contact 9 touches the contact 10. The contacts 9, 10 and 11 respectively are connected by way of leads 18, 19 and 20 to slip rings 21, 22 and 23 and from there by brushes 24, 25 and 26 to leads 27, 28 and 29 forming part of the supply circuit of an alternating current two phase reversible electric motor 30.

As shown schematically in Figure 2, the closing of contacts 9 and 10 serves to connect the motor to the supply in such a way that one of the phases 31 is connected directly across the supply, while the other phase 32 is connected to the supply through a condenser 33, which advances the phase-angle in that winding. Similarly, closing of the contacts 9 and 11 connects the phase 32 directly to the supply and the phase 31 through the condenser 33, thus reversing the motor 30. The motor 30 is connected by reduction gearing 34 and 35 to a shaft 36 which carries a worm wheel 37 driving a toothed wheel 38 forming part of the rotatable member 16. The rotatable member 16 is carried by a spindle 39 coaxial with, but independent of, the spindle 6.

Closing of the contacts 9 and 11 brought about by a fall in the liquid level thus causes the motor 30 to turn in such a direction as to drive the rotatable member 16 in a counter-clockwise direction moving the contact 11 downwards from the position shown until, when the displacer 1 reaches its new equilibrium position, the contact 11 breaks from the contact 9 and the motor 30 stops. In this new position, the spring 17 will again balance the downward force on the displacer 1. Similarly, closing of the contacts 9 and 10 brought about by a rise in the liquid level, causes the rotatable member 16 to turn in a clockwise direction until a new equilibrium position is reached. By suitable adjustment of the contacts 10 and 11, the apparatus may be made to hunt or be "dead beat" as required.

Connected to the spindle 39 by a worm 40 and a pinion 41 is a local indicator 42 giving a direct reading of the liquid level. To enable the liquid level to be read at one or more distant points, a step-by-step transmitter 43 is provided on the shaft 36 and from this, any desired number of remote indicators such as that shown at 44 may be driven.

I claim:

1. An apparatus for indicating and measuring the level of liquids, comprising in combination, a displacer body arranged for submersion in said liquid to an extent such that the resultant force on said displacer body is downward, a spindle mounted for rotation, a radial contact arm rigidly connected to said spindle, a drum mounted on said spindle, a cord connected at one end to and wound around the periphery of said drum and connected at the other end to said displacer body to balance the resultant force in said displacer body by the tension in said cord, a follower member mounted coaxially with said spindle for independent rotation adjacent said radial contact arm, tension spring means connected between said radial contact arm and said follower member for opposing the tension applied to said periphery of said drum by said cord, a contact blade carried by said radial arm, a pair of electrical contacts comprising a first contact and a second contact insulated from and carried by said follower member in circumferential spaced relationship on opposite sides of said contact blade, reversible drive means for producing rotation of said follower member, a control circuit completed by contact between said blade and said first contact for energizing said drive means to rotate said follower member in a direction to separate said blade and said first contact, a second control circuit completed by contact between said blade and said second contact for energizing said drive means to rotate said follower member in a direction to separate said blade and said second contact, and means for indicating the position of said follower member.

2. An apparatus for indicating and measuring the level of liquids, comprising in combination, a displacer body arranged for submersion in said liquid to an extent such that the resultant force on said displacer body is downward, a spindle mounted for rotation, a radial contact arm rigidly connected to said spindle, a drum mounted on said spindle, a cord connected at one end to and wound around the periphery of said drum and connected at the other end to said displacer body to balance the resultant force on said displacer body by the tension in said cord, a follower member mounted coaxially with said spindle for independent rotation adjacent said radial contact arm, tension spring means connected between said radial contact arm and said follower member for opposing the tension applied to said periphery of said drum by said cord, a contact blade carried by said radial arm, a pair of electrical contacts comprising a first contact and a second contact insulated from and carried by said follower member in circumferential spaced relationship on opposite sides of said blade, a reversible electric motor, speed reduction, gearing transmitting the drive of said electric motor to said follower member, mechanical means for indicating the position of said follower member, a source of current supply, a control circuit completed by contact between said blade and said first contact for connecting said electric motor to said source of supply for operation in one direction, a second control circuit completed by contact between said blade and said second contact for connecting said electric motor to said source of supply for operation in the opposite direction, electrical transmitting means, means for driving said transmitting means from said follower member and electrical receiving means energized by said transmitting means for indicating the position of said follower member.

3. An apparatus for indicating and measuring the level of liquids, comprising in combination, a displacer body arranged for submersion in said liquid to an extent such that the resultant force on said displacer body is downward, a movable contact arm mounted for movement along a predetermined path, a follower member mounted for independent movement adjacent said predetermined path, a pair of relatively fixed contacts carried by said follower member on opposite sides of said movable arm and extending into the path of movement of said arm, reversible electric means for driving said follower member in opposite directions, energizing circuits controlled by engagement of said arm with said relatively fixed contacts for energizing said driving means to drive said follower member in a direction to interrupt contact between said arm and said relatively fixed contacts, flexible means connecting said displacer body to said contact arm to apply the resultant force of said displacer body to said arm in one direction of movement of said arm, spring means connected between said contact arm and said follower member and normally biasing said arm for movement in the opposite direction, whereby said displacer body is supported in part by said spring and in part by its own buoyancy, and means for indicating the position of said follower member.

JOHN CUTHBERT NEEDHAM.

REFERENCES CITED

The following references are of record in the file of this patent:

UNITED STATES PATENTS

| Number | Name | Date |
| --- | --- | --- |
| 532,868 | Bull | Jan. 22, 1895 |
| 1,013,465 | Wagenen | Jan. 2, 1912 |
| 1,057,261 | Norton | Mar. 27, 1913 |
| 1,658,449 | Loffler | Feb. 7, 1928 |
| 1,992,780 | Skeets | Feb. 26, 1935 |

FOREIGN PATENTS

| Number | Country | Date |
| --- | --- | --- |
| 264,401 | Germany | Sept. 24, 1913 |
| 319,684 | Great Britain | May 8, 1930 |
| 435,441 | Great Britain | Sept. 20, 1935 |